(No Model.) 2 Sheets—Sheet 2.

C. E. BALL.
DYNAMO ELECTRIC MACHINE.

No. 259,791. Patented June 20, 1882.

WITNESSES:
S. P. Van Stavoren
R. A. Dellett

INVENTOR
Charles E. Ball,
By Connolly Bros,
ATTORNEYS

UNITED STATES PATENT OFFICE.

CHARLES E. BALL, OF PHILADELPHIA, PENNSYLVANIA.

DYNAMO-ELECTRIC MACHINE.

SPECIFICATION forming part of Letters Patent No. 259,791, dated June 20, 1882.

Application filed November 21, 1881. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Dynamo-Electric Machines; and I do hereby declare the following to be a full, clear, and exact description of the invention, reference being had to the accompanying drawings, which form part of this specification, in which—

Figure 1:
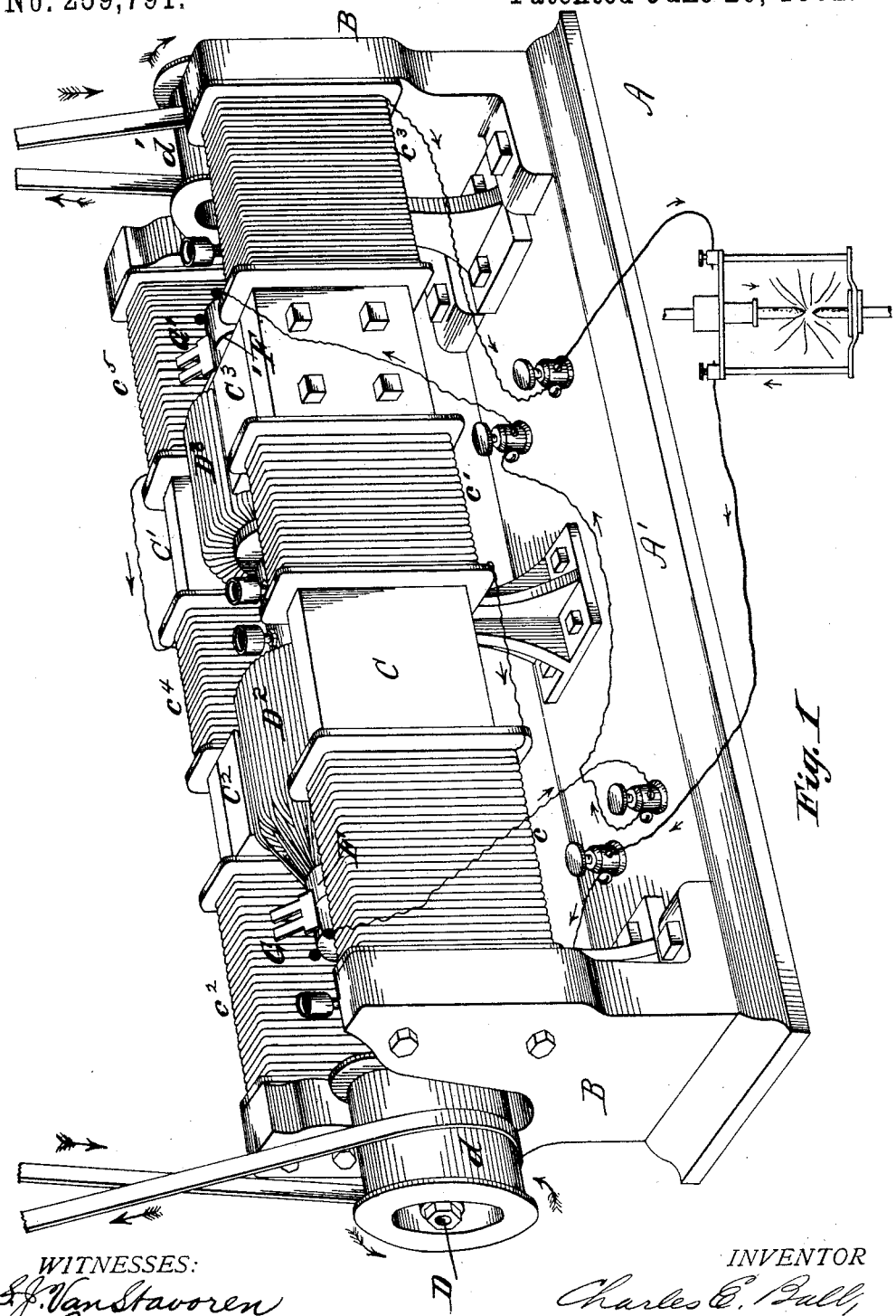
Figure 2:
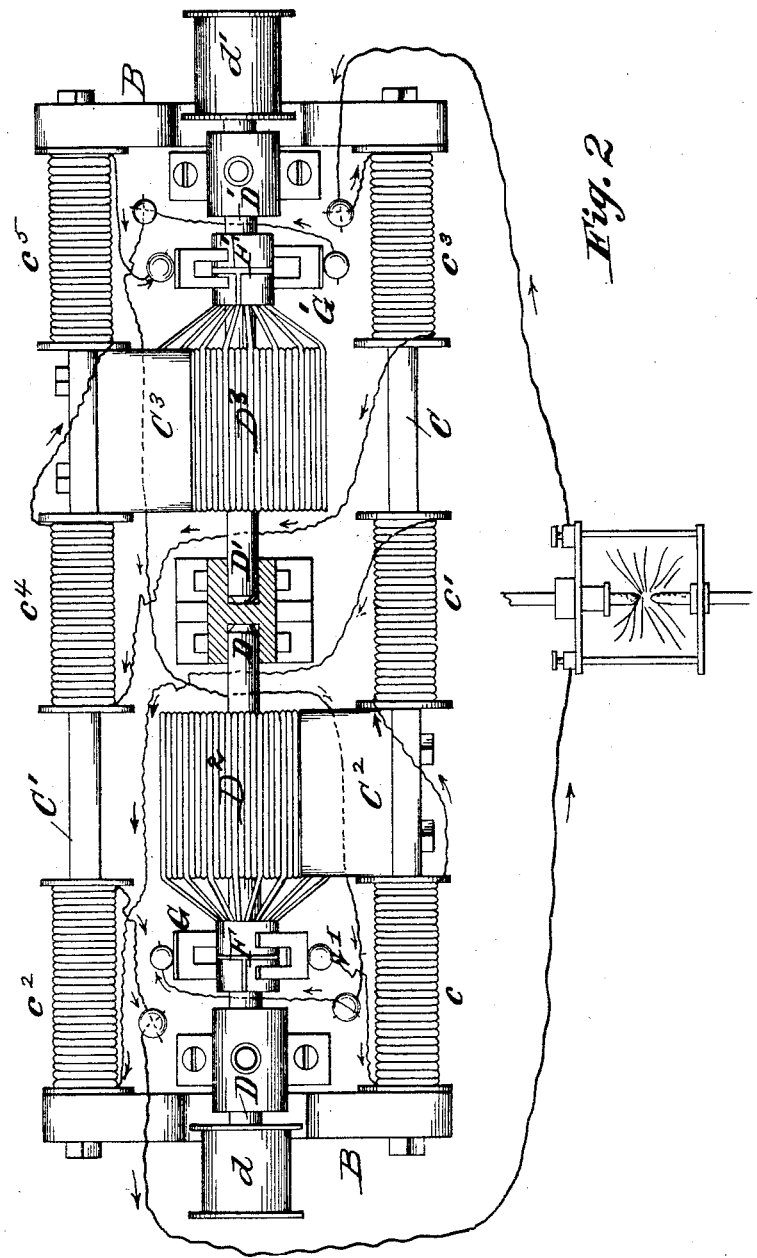

Figure 1 is a perspective of a dynamo-electric machine embodying my invention, and Fig. 2 is a plan of the same.

My invention has relation to dynamo-electric machines; and my improvements have for their object to increase the capacity or productiveness of such instrumentalities as generators of electricity, at the same time decreasing their relative size, weight, and cost, and the power required to run them.

Heretofore dynamo-electric machines have been so constructed that the armature revolved in the field or within the inductive influence of two or more poles of a magnet or magnets. The theory or principle of this construction is that the armature becomes magnetized inductively in passing each pole and demagnetized in leaving the same, the poles, as they succeed one another, being unlike, causing the propagation of currents of unlike polarity or direction in the armature. The idea of this construction has been that the greater the speed with which the magnetization and demagnetization and the change of direction of the current could be effected the greater or more intense would be the current developed. I have discovered, however, that by employing only one pole of the field-magnet, or, what amounts to the same thing, arranging the armature to rotate within the inductive influence of only one pole of the field-magnet, vastly improved results can be obtained—that is, that greater quantity and increased intensity of current are secured, while at the same time the armature will require very much less power to effect its rotation than would be necessary if rotated in the field of two or more poles.

Hence my invention, in the first place, consists in the arrangement, in a dynamo-electric machine, of an armature rotating in the field of only one pole of a magnet.

I have further discovered that by constructing a dynamo-electric machine with two armatures, each of which revolves within the inductive influence of only one pole of a magnet, and connecting the magnet and armature helices in one circuit, the quantity and intensity of current generated will be vastly increased.

My invention therefore further consists in the combination, in a dynamo-electric machine, of two or more armatures, each arranged to rotate in the inductive field of only one pole of an electro-magnet, both of said armatures and the magnet being in the same circuit.

Referring to the accompanying drawings, A shows the frame of the machine, consisting of an iron base, A′, with two uprights or end pieces, B B, of the same material, securely bolted to said base.

C C′ represent two parallel bars of soft iron, sustained by their ends in the uprights B B. These bars C C′ constitute the cores of the electro-magnets composing the field. Each of these bars is wound with wire to form helices, designated on the drawings by the letters $c$ $c'$ $c^2$ $c^3$ $c^4$ $c^5$, respectively. To the inside of each bar is fastened an iron pole-piece, said pieces being designated by the letters $C^2$ $C^3$.

D D′ represent two shafts in the same line but independent of each other, each having a pulley, $d$ $d'$, whereby said shafts and the armatures which they carry can be rotated in opposite directions—*i. e.*, shaft D in one direction and shaft D′ in the contrary direction.

$D^2$ $D^3$ are armatures of any ordinary or suitable construction, carried on the shafts D D′ and located within the inductive influence of the poles $C^2$ $C^3$—*i. e.*, armature $D^2$ is in the field of pole $C^2$ and armature $D^3$ in the field of pole $C^3$.

F and F′ represent the commutators, and G and G′ the brushes for taking the currents off the commutator. The circuits are shown in lines, and by arrows which indicate the direction.

Leaving commutator F, as shown by arrow 1, current passes through helix $c$, thence to helix $c'$, thence across to helix $c^2$, around (by external circuit) to helix $c^3$, thence to helices $c^4$ $c^5$, from latter to commutator F′ and armature $D^3$, and by brushes and commutators to armature $D^2$, and thence to the point of starting. Following these directions it will be found that the path of the current is, starting from the armature $D^2$, first through the two helices between which the pole-piece opposing said armature is situated, thence to the helix on the opposite side and adjacent end of the machine, thence by an external circuit (in which the lamp or other appliance to which the current is or may be applied may be located) to the helix on the opposite side and other end of the machine, thence to the two helices on the opposite side and same end of the machine, thence to the armature $D^3$, and from the latter, by the way of the commutators and brushes, to the armature $D^2$, completing the circuit. So connected the field may be said to consist of but a single magnet, of which the unlike poles are the pieces $C^2$ $C^3$. These poles, as stated, are unlike, and the armatures are rotated in opposite directions; but the connections established make the derived currents all of the same direction in the external circuit. By altering the connections the poles may be rendered alike and the currents still preserved of like direction. Hence my invention is not limited to an arrangement involving unlike poles; but when the poles are alike the armatures should revolve in the same direction, in which case they may be mounted on one shaft or on independent shafts.

What I claim as my invention is as follows:

1. In a dynamo-electric machine, a single electro-magnet and an armature located and adapted to rotate within the inductive field of only one of the poles of such magnet, substantially as set forth.

2. In a dynamo-electric machine, the combination of two armatures and an electro magnet or magnets, each of said armatures being arranged and adapted to rotate in the inductive field of only a single pole of such magnet or magnets, substantially as set forth.

3. In a dynamo-electric machine, the combination of two armatures and two poles of an electro magnet or magnets, each of said armatures rotating in the inductive field of only a single pole, and said armatures and magnet or magnets being in the same circuit, substantially as set forth.

4. In a dynamo-electric machine, the combination of two armatures on independent shafts, whereby they may be rotated in opposite directions, and an electro magnet or magnets in circuit therewith, each of said armatures being located and adapted to be rotated within the inductive field of only one pole of a magnet, substantially as set forth.

5. In a dynamo-electric machine, the combination of two armatures and an electro magnet or magnets having pole-pieces on opposite sides of the machines, said armatures and magnet or magnets being relatively arranged substantially as described, whereby each of said armatures is located and adapted to be rotated within the inductive field of only one magnetic pole, substantially as set forth.

6. The combination, in a dynamo-electric machine, of two armatures and an electro magnet or magnets having pole-pieces on opposite sides, each of said armatures being located and adapted to rotate in the inductive field of only one pole of a magnet, said armatures and electro-magnets being connected substantially as described, whereby the circuit is direct from one armature to the other and through all the helices of the magnets successively, substantially as shown and described.

7. The combination of two armatures on independent shafts and an electro magnet or magnets having pole-pieces on opposite sides of said armatures, the latter being located and adapted to rotate each within the inductive field of only one magnetic pole, said armature and magnet or magnets being in the same circuits, substantially as set forth.

In testimony that I claim the foregoing I have hereunto set my hand this 19th day of November, 1881.

CHAS. E. BALL.

Witnesses:
S. J. VAN STAVOREN,
CHAS. F. VAN HORN.